(12) United States Patent
Ravada et al.

(10) Patent No.: US 11,507,590 B2
(45) Date of Patent: Nov. 22, 2022

(54) TECHNIQUES FOR IN-MEMORY SPATIAL OBJECT FILTERING

(71) Applicant: Oracle International Corporation, Redwood Shores, CA (US)

(72) Inventors: Siva Ravada, Nashua, NH (US); Ying Hu, Nashua, NH (US); Zhen Hua Liu, San Mateo, CA (US); Shasank Kisan Chavan, Menlo Park, CA (US); Aurosish Mishra, Belmont, CA (US); Vikas Arora, Burlingame, CA (US)

(73) Assignee: Oracle International Corporation, Redwood Shores, CA (US)

( * ) Notice: Subject to any disclaimer, the term of this patent is extended or adjusted under 35 U.S.C. 154(b) by 121 days.

(21) Appl. No.: 16/904,392

(22) Filed: Jun. 17, 2020

(65) Prior Publication Data

US 2021/0081428 A1 Mar. 18, 2021

Related U.S. Application Data

(60) Provisional application No. 62/899,841, filed on Sep. 13, 2019.

(51) Int. Cl.
*G06F 16/25* (2019.01)
*G06F 16/22* (2019.01)
(Continued)

(52) U.S. Cl.
CPC .......... *G06F 16/252* (2019.01); *G06F 9/3887* (2013.01); *G06F 16/221* (2019.01);
(Continued)

(58) Field of Classification Search
CPC .................................................... G06F 16/252
(Continued)

(56) References Cited

U.S. PATENT DOCUMENTS 5,572,634 A 11/1996 Duluk
6,252,605 B1 6/2001 Beesley et al.
(Continued)

FOREIGN PATENT DOCUMENTS

WO WO 2017/070188 A1 4/2017

OTHER PUBLICATIONS

"Murray, Oracle Spatial, Mar. 2002 Part No. A96630-01, Release 9.2" (Year: 2002).*

(Continued)

*Primary Examiner* — Muluemebet Gurmu
(74) *Attorney, Agent, or Firm* — Hickman Becker Bingham Ledesma LLP

(57) ABSTRACT

Techniques are introduced herein for maintaining geometry-type data on persistent storage and in memory. Specifically, a DBMS that maintains a database table, which includes at least one column storing spatial data objects (SDOs), also maintains metadata for the database table that includes definition data for one or more virtual columns of the table. According to an embodiment, the definition data includes one or more expressions that calculate minimum bounding box values for SDOs stored in the geometry-type column in the table. The one or more expressions in the metadata maintained for the table are used to create one or more in-memory columns that materialize the bounding box data for the represented SDOs. When a query that uses spatial-type operators to perform spatial filtering over data in the geometry-type column is received, the DBMS replaces the spatial-type operators with operators that operate over the scalar bounding box information materialized in memory.

24 Claims, 8 Drawing Sheets

(51) Int. Cl.
  *G06F 9/38* (2018.01)
  *G06F 16/242* (2019.01)
  *G06F 16/2457* (2019.01)

(52) U.S. Cl.
  CPC ...... *G06F 16/2282* (2019.01); *G06F 16/2425* (2019.01); *G06F 16/24575* (2019.01)

(58) Field of Classification Search
  USPC .......................................................... 707/769
  See application file for complete search history.

(56) References Cited

U.S. PATENT DOCUMENTS

| | | | |
|---|---|---|---|
| 6,353,828 B1 | 3/2002 | Ganesh | |
| 6,460,045 B1 | 10/2002 | Aboulnaga et al. | |
| 6,701,306 B1 | 3/2004 | Kronmiller | |
| 6,959,304 B1 | 10/2005 | Teig et al. | |
| 7,080,065 B1 | 7/2006 | Kothuri | |
| 7,725,425 B2 | 5/2010 | Smartt | |
| 7,769,733 B2 | 8/2010 | Chen et al. | |
| 9,009,199 B2 | 4/2015 | Asmundsson | |
| 9,317,529 B2 | 4/2016 | Bamba et al. | |
| 9,519,680 B2 | 12/2016 | Hu et al. | |
| 9,659,045 B2 | 5/2017 | Liu et al. | |
| 10,204,135 B2 | 2/2019 | Mishra et al. | |
| 2002/0178341 A1 | 11/2002 | Frank | |
| 2003/0187862 A1 | 10/2003 | Brobast | |
| 2004/0073541 A1 | 4/2004 | Lindblad et al. | |
| 2005/0015216 A1 | 1/2005 | Kothuri | |
| 2006/0047696 A1 | 3/2006 | Larson | |
| 2006/0184519 A1 | 8/2006 | Smartt | |
| 2006/0230017 A1 | 10/2006 | Larson | |
| 2007/0112736 A1 | 5/2007 | Okamoto et al. | |
| 2007/0288718 A1 | 12/2007 | Cholleti et al. | |
| 2008/0059412 A1 | 3/2008 | Tarin | |
| 2008/0162424 A1 | 7/2008 | Adler | |
| 2008/0177722 A1 | 7/2008 | Lohman | |
| 2008/0281801 A1 | 11/2008 | Larson et al. | |
| 2009/0094010 A1 | 4/2009 | Kothuri | |
| 2009/0150366 A1 | 6/2009 | Basu | |
| 2011/0106843 A1 | 5/2011 | Pan | |
| 2011/0145244 A1 | 6/2011 | Kim et al. | |
| 2012/0158736 A1 | 6/2012 | Milby | |
| 2012/0166423 A1* | 6/2012 | Milby ............... | G06F 16/24542 707/718 |
| 2012/0166446 A1 | 6/2012 | Bowman | |
| 2013/0060547 A1 | 3/2013 | Beran et al. | |
| 2013/0151524 A1 | 6/2013 | McKenney et al. | |
| 2014/0052713 A1 | 2/2014 | Schauer et al. | |
| 2014/0095519 A1 | 4/2014 | Liu et al. | |
| 2015/0049944 A1 | 2/2015 | Bamba et al. | |
| 2015/0134670 A1 | 5/2015 | Liu et al. | |
| 2015/0317358 A1 | 11/2015 | Hu et al. | |
| 2016/0071233 A1 | 3/2016 | Macko et al. | |
| 2016/0179836 A1 | 6/2016 | Guo | |
| 2016/0350347 A1 | 12/2016 | Das et al. | |
| 2017/0031975 A1* | 2/2017 | Mishra ................ | G06F 16/2393 |
| 2017/0060912 A1 | 3/2017 | Liu et al. | |
| 2017/0060973 A1* | 3/2017 | Liu ........................ | G06F 16/86 |
| 2017/0147705 A1 | 5/2017 | Kasperovics et al. | |
| 2018/0011893 A1 | 1/2018 | Kimura | |
| 2018/0075105 A1* | 3/2018 | Chavan ............... | G06F 16/2282 |
| 2018/0089261 A1 | 3/2018 | Li et al. | |
| 2018/0096000 A1 | 4/2018 | Harrison et al. | |
| 2019/0243926 A1 | 8/2019 | Kadwe et al. | |
| 2019/0286722 A1 | 9/2019 | Barov | |
| 2019/0303506 A1 | 10/2019 | Bross et al. | |
| 2022/0245147 A1 | 8/2022 | Segalini et al. | |

OTHER PUBLICATIONS

U.S. Appl. No. 14/754,210, filed Jun. 29, 2015, Office Action, dated Apr. 11, 2016.

U.S. Appl. No. 14/754,210, filed Jun. 29, 2015, Notice of Allowance, dated Aug. 5, 2016.

U.S. Appl. No. 13/966,691, filed Aug. 14, 2013, Supplemental Notice of Allowability, dated Feb. 24, 2016.

U.S. Appl. No. 13/966,691, filed Aug. 14, 2013, Office Action, dated Jun. 2, 2015.

U.S. Appl. No. 13/966,691, filed Aug. 14, 2013, Notice of Allowance, dated Sep. 1, 2015.

Mishra, U.S. Appl. No. 15/146,799, filed May 4, 2016, Office Action, dated Jun. 14, 2018.

Mishra, U.S. Appl. No. 15/146,799, filed May 4, 2016, Notice of Allowance, dated Sep. 28, 2018.

Zhou et al., "Efficient Exploitation of Similar Subexpressions for Query Processing", Acm Sigmond, dated Jan. 1, 2007, 12 pages.

Wald, I. et al., "On building fast kd-Trees for Ray Tracing, and on doing that in O" (N log N) IEEE Symposium on Interactive Ray Tracing 2006 (9 pages).

Samet, H. et al., "Storing a Collection of Polygons Using Quadtrees", ACM Transactions on Graphics, Jul. 3, 1985 (41 pages).

Paul M. Aoki, "How to Avoid Buliding DataBlades That Know the Value of Everything and the Cost of Nothing", Computer Science Divison, EECS Department, University of California, Berkeley, 12 pgs, 1999.

Milena G Ivanova et al., "An Architecture for Recycling Intermediates in a Column-Store", SIGMOD-PODS, dated Jun. 29, 2009, 12 pages.

Guttman, A., "R-Trees: A Dynamic Index Structure for Spatial Searching", 1984 ACM (11 pages).

Eberhardt, H. et al., "Density Trees for Efficient Nonlinear State Estimation," Proceedings of the 13th International Conference on Information Fusion, Edinburgh, United Kingdom, Jul. 2010 (8 pages).

Bentley, J., "Multidimensional Binary Search Trees Used for Associative Searching", 1975 ACM Student Award (9 pages).

Beckmann N. et al., "The R*-tree: An Efficient and Robust Access Method for Points and Rectangles" 1990 ACM (10 pages).

Anonymous:, "Intverted Index—Wikipedia", dated Jan. 9, 2016, https://en.wikipedia.org/w/index.php?title=Inverted_index&oldid= 698960983, 4 pages.

Acharya, S. et al., "Selectivity Estimation in Spatial Databases", SIGMOD 1999 (12 pages).

SAP HANA, "Graph Workspaces," https://help.sap.com/viewer/ f381aa9c4b99457fb3c6b53a2fd29c02/2.0.03/en-US, 1pg.

SQL Server, "Optimizing SQL Server Spatial Queries with Bounding Box", https://aboutsqlserver.com/2013/09/03/optimizing-sql-server-spatial-queries-with-bounding-box/, dated Sep. 3, 2013, 14 pages.

Rudnytskiy, "Understand Spatial Columns in SAP HANA Spatial", https://developers.sap.com/tutorials/hana-spatial-intro4-columns. html, dated Dec. 11, 2016, 14 pages.

Oracle Spatial User's Guide and References, "Spatial Data Types and Metadata", Release 9.2, Part No. A96630-01, https://docs.oracle. com/cd/B10501_01/appdev.920/a96630/sdo_objrelschema.htm, 26 pages, Mar. 2002.

Oracle Online Documentation Library, "1.8 Spatial Relationships and Filtering", 12c Release 1 (12.1.0.2), https://docs.oracle.com/ database/121/SPAT/spatial-relationships-and-filtering.htm, 4 pages, 1999, 2017.

Oracle Database Concepts, "Data Concurrency and Consistency", Chapter 13, 10g Release (10.1), Part No. B10743-01, dated Dec. 2003, 39 pages.

Murray et al., "Spatial and Graph Developer's Guide", 20c, F15831-03, dated Apr. 2020, 1,164 pages.

Kelly, Wikibon, "Primer on SAP HANA", wikibon.org/wiki/v/ Primer_on_SAP_HANA, dated Jul. 12, 2013, 6 pages.

Chapter 7. Performance Tips, https://postgis.net/docs/performance_ tips.html, dated Mar. 30, 2020, 7 pages.

Artemiou, "Introducing SQL Server In-Memory OLTP", https:// www.red-gate.com/simple-talk/sql/learn-sql-server/introducing-sql-server-in-memory-oltp/, dated Sep. 30, 2015, 10 pages.

Liu, U.S. Appl. No. 16/022,465, filed Jun. 28, 2018, Advisory Action, dated Jul. 26, 2021.

(56) References Cited

OTHER PUBLICATIONS

Liu, U.S. Appl. No. 16/022,465, filed Jun. 28, 2018, Notice of Allowance and Fees Due, dated Sep. 2, 2021.
Liu, U.S. Appl. No. 16/022,465, filed Jun. 28, 2018, Notice of Allowance and Fees Due, dated Sep. 9, 2021.
Wang et al., "Investigating Memory Optimization of Hash-index for Next Generation Sequencing on Multi-core Architecture", 2012 IEEE, pp. 665-674.
Oracle Spatial User's Guide and References, "Spatial Data Types and Metadata", Release 9.2, Part No. A96630-01, Mar. 2002 https://docs.oracle.com/cd/B10501_01/appdev.920/a96630/sdo_objrelschema.htm, 26 pages.
Liu, U.S. Appl. No. 16/022,465, filed Jun. 28, 2018, Office Action, dated Feb. 23, 2021.
Sap Hana, "Create an SAP HANA Graph Workspace", Tutorials for SAP Developers, https://developers.sap.com/tutorials/hana-graph-overview-setup.html, dated Dec. 19, 2018, 17 pages.
PostGIS 2.3.10 Manual, "Performance Tips", Chaper 7, dated Aug. 11, 2018, 5 pages.
Paul M. Aoki, "How to Avoid Buliding DataBlades That Know the Value of Everything and the Cost of Nothing", Computer Science Divison, EECS Department, University of California, Berkeley, Year 1999, 12 pages.
Liu et al., U.S. Appl. No. 16/022,465, filed Jun. 28, 2018, Interview Summary, dated May 10, 2021.
Liu et al., U.S. Appl. No. 16/022,465, filed Jun. 28, 2018, Final Office Action, dated May 17, 2021.
Segalini, U.S. Appl. No. 17/162,527, filed Jan. 29, 2021, Non-Final Rejection, dated Mar. 17, 2022.
Segalini, U.S. Appl. No. 17/162,527, filed Jan. 29, 2021, Notice of Allowance and Fees Due Aug. 5, 2022.
Segalini et al., U.S. Appl. No. 17/162,527, filed Jan. 29, 2021, Notice of Allowance and Fees Due Jun. 24, 2022.

\* cited by examiner

MATERIALIZED COLUMNS OF (PF) TABLE 132

| ID 202 | SDO 204 | SDO_NAME 206 |
|---|---|---|
| 01 | SDO_01 | "ALAMEDA COUNTY" |
| 02 | SDO_02 | "MARIN COUNTY" |
| 03 | SDO_03 | "SAN MATEO COUNTY" |

VIRTUAL COLUMNS OF TABLE 132

| ID 202 | MIN_X 210 | MAX_X 212 | MIN_Y 214 | MAX_Y 216 | MIN_Z 218 | MAX_Z 220 |
|---|---|---|---|---|---|---|
| 01 | | | | | | |
| 02 | | | | | | |
| 03 | | | | | | |

A TOUCH B

9-Intersection Matrix

FIG. 5

502 — MAINTAIN, ON DISK BY A DATABASE MANAGEMENT SYSTEM, A FIRST TABLE THAT STORES A PLURALITY OF COLUMNS THAT COMPRISES ONE OR MORE GEOMETRY-TYPE COLUMNS, WHERE THE DATABASE MANAGEMENT SYSTEM MAINTAINS METADATA DEFINING THE PLURALITY OF COLUMNS, WHERE SAID METADATA INCLUDES A DEFINITION OF ONE OR MORE VIRTUAL COLUMNS OF SAID PLURALITY OF COLUMNS, AND WHERE THE DEFINITION COMPRISES ONE OR MORE EXPRESSIONS THAT DERIVE VALUES FOR THE ONE OR MORE VIRTUAL COLUMNS FROM THE ONE OR MORE GEOMETRY-TYPE COLUMNS

504 — CREATE A SET OF IN-MEMORY COLUMNS THAT MATERIALIZES RESULTS OF THE ONE OR MORE EXPRESSIONS BASED ON THE ONE OR MORE GEOMETRY-TYPE COLUMNS

506 — COMPILE, BY THE DATABASE MANAGEMENT SYSTEM, A QUERY THAT INCLUDES A PARTICULAR OPERATOR THAT OPERATES ON THE ONE OR MORE GEOMETRY-TYPE COLUMNS, WHERE SAID COMPILING COMPRISES REWRITING THE QUERY TO GENERATE A REWRITTEN QUERY THAT INCLUDES AT LEAST ONE EXPRESSION OF THE ONE OR MORE EXPRESSIONS

508 — EXECUTE THE REWRITTEN QUERY, WHERE SAID EXECUTING THE REWRITTEN QUERY COMPRISES: DETECTING THE AT LEAST ONE EXPRESSION IN THE REWRITTEN QUERY, BASED ON SAID DETECTING THE AT LEAST ONE EXPRESSION IN THE REWRITTEN QUERY, PERFORMING ONE OR MORE TASKS, REQUIRED BY THE PARTICULAR OPERATOR, BASED ON THE SET OF IN-MEMORY COLUMNS, AND RETURNING A RESULT DATA SET

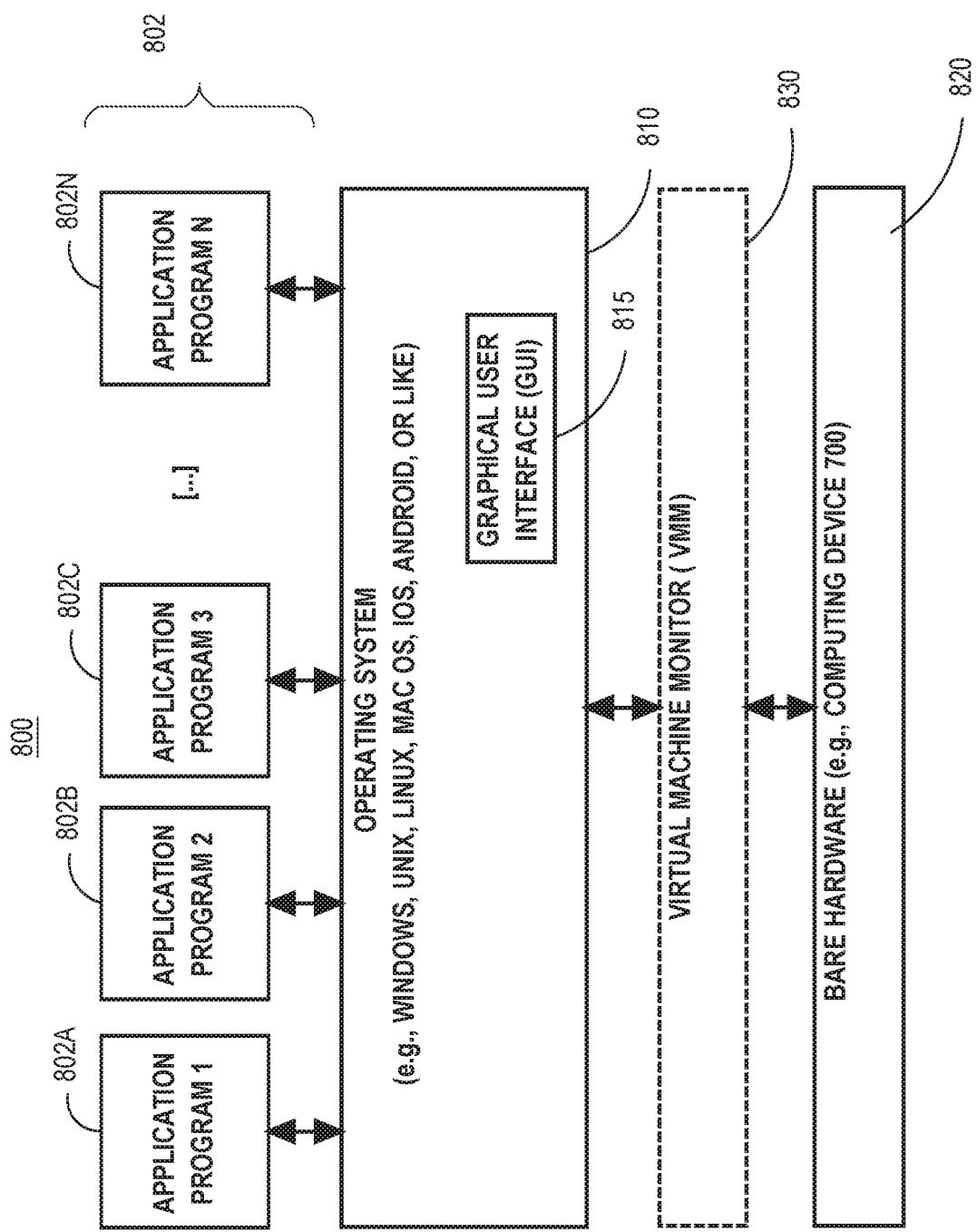

TECHNIQUES FOR IN-MEMORY SPATIAL OBJECT FILTERING

CROSS-REFERENCE TO RELATED APPLICATIONS; BENEFIT CLAIM

This application claims the benefit of Provisional Appln. No. 62/899,841, filed Sep. 13, 2019, titled "Techniques For In-Memory Spatial Object Filtering", the entire contents of which is hereby incorporated by reference as if fully set forth herein, under 35 U.S.C. § 119(e).

Furthermore, this application is related to the following applications, the entire contents of each of which is incorporated by reference as if fully set forth herein:
  U.S. Patent Publication No. 2020/0004736A1, filed Jun. 28, 2018, titled "Techniques for Enabling and Integrating In-Memory Semi-Structured Data and Text Document Searches with In-Memory Columnar Query Processing";
  U.S. Pat. No. 9,317,529 B2, issued Apr. 19, 2016, titled "Memory-Efficient Spatial Histogram Construction";
  U.S. Pat. No. 9,519,680 B2, issued Dec. 13, 2016, titled "Methods for Query Processing of Topological Relationships Among Complex Spatial Objects"; and
  U.S. Pat. No. 10,204,135 B2, issued Feb. 12, 2019, titled "Materializing Expressions Within In-Memory Virtual Column Units To Accelerate Analytic Queries".

FIELD OF THE INVENTION

The present invention relates to spatial data objects maintained by database management systems, and, more specifically, to materializing, in memory, bounding box data for spatial data objects to facilitate efficient filtering of the spatial data objects.

BACKGROUND

A relational database management system (DBMS) allows customization and querying of information in a relational database (RDB). Generally, RDBs store data in database objects, such as tables that organize stored data into rows and columns. Database tables may store scalar data, such as numbers and strings, and/or complex datatypes, which are generally composite datatypes that incorporate one or more scalar datatypes in a datatype-specific structure.

A common complex datatype is the spatial data (or geometry-type) object. A spatial data object (SDO) includes geometric data that defines a given geometry in two or three dimensions. The geometric data stored in a given SDO may be construed as coordinates that define a geometry based on the relative locations of features of the geometry in a larger spatial data landscape, such as on the surface of a sphere or within a two- or three-dimensional coordinate system. To illustrate, an example SDO defines a two-dimensional polygon on a given plane, or defines a three-dimensional spherical polygon on the surface of a given sphere.

One useful operation over SDOs is determining topological relationships between represented geometries. Most of the topological relationships between geometries are expressible in terms of intersections of a boundary, an interior, and an exterior of one geometry with a boundary, interior and exterior of another geometry. For example, the topological relationship of 'B inside A' means that (a) the interiors of geometry A and geometry B intersect, (b) the exterior and boundary of geometry B intersects the interior of geometry A, (c) the boundary of geometry B does not intersect the boundary or the exterior of geometry A, and (d) the interior of geometry B does not intersect the boundary or the exterior of geometry A.

The complexity of data that defines a geometry causes operators that operate over SDOs to require much more processing power than operations that are performed over less complex, or even scalar, data types. As such, performance of SDO operators is generally improved by creating indexes over SDO data, such as R+ coordinate search tree indexes. However, creating and maintaining indexes over SDO data requires computing resources. For example, when SDO data is changed, any corresponding index must be updated.

Furthermore, it is common that, in a relational DBMS, a table may include both scalar-type columns and geometry-type columns, and users may issue mixed queries that perform both range filtering over scalar-type columns and spatial filtering over geometry-type columns. While R+ tree indexes work very well to speed up operations over geometry-type data, use of such an index may not be effective for mixed-query cases. Specifically, an index, such as a B+ tree range index, may be created to index a scalar data column in a table and an R+ tree index may be created to index data in a geometry-type column in the same table. These indexes can be joined to facilitate a mixed query over both the scalar- and geometry-type columns. However, if the mixed-type query refers to scalar data that is not indexed, the effectiveness of any index over the geometry-type data is reduced.

Many times, spatial data filtering may be performed or sped up using minimum bounding box information for the geometries that are being filtered. The bounding box of a geometry is a rectangle (for a 2D geometry) or a 3D box (for a 3D geometry) that encompasses the entirety of the geometry. A minimum bounding box is the smallest possible bounding box that encompasses the entirety of the geometry. Metadata that defines minimum bounding boxes for geometries that are stored in a given table may be defined in virtual columns for the table. However, because virtual columns are defined using expressions over materialized data, the results of which not materialized on disk, expressions that define the virtual columns must be calculated every time the bounding box metadata is needed to perform spatial data filtering. The need to repeatedly calculate the expressions for the virtual columns reduces the effectiveness of using the bounding box information to speed up query processing for some applications.

Furthermore, the bounding box information for geometry-type columns may be materialized on disk to eliminate the need to calculate the values every time the minimum bounding box information is needed. However, the information in the materialized bounding box columns must be updated every time the represented geometries change. The requirement of maintaining the materialized bounding box columns on disk reduces the effectiveness of the columns for speeding up spatial data filtering. Furthermore, queries over the represented SDOs would need to be manually changed to refer to the materialized bounding box columns, which introduces the chance for user error in utilizing the bounding box information, or even a user overlooking use of the bounding box information for efficient filtering of the represented spatial data.

As such, it would be beneficial to improve the performance of spatial filtering over geometry-type columns without requiring indexes that index the geometry-type data, and without requiring calculation of minimum bounding box information for each query over the spatial data, or even materialization of bounding box information on disk.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 5 depicts a flowchart for materializing, in memory, one or more in-memory columns based on expressions, in definitions of virtual columns, that derive values from geometric data materialized on disk, and using the in-memory columns for a query over the geometric data.

FIG. 8 is a block diagram of a basic software system that may be employed for controlling the operation of a computer system.

DETAILED DESCRIPTION

Figure 1:
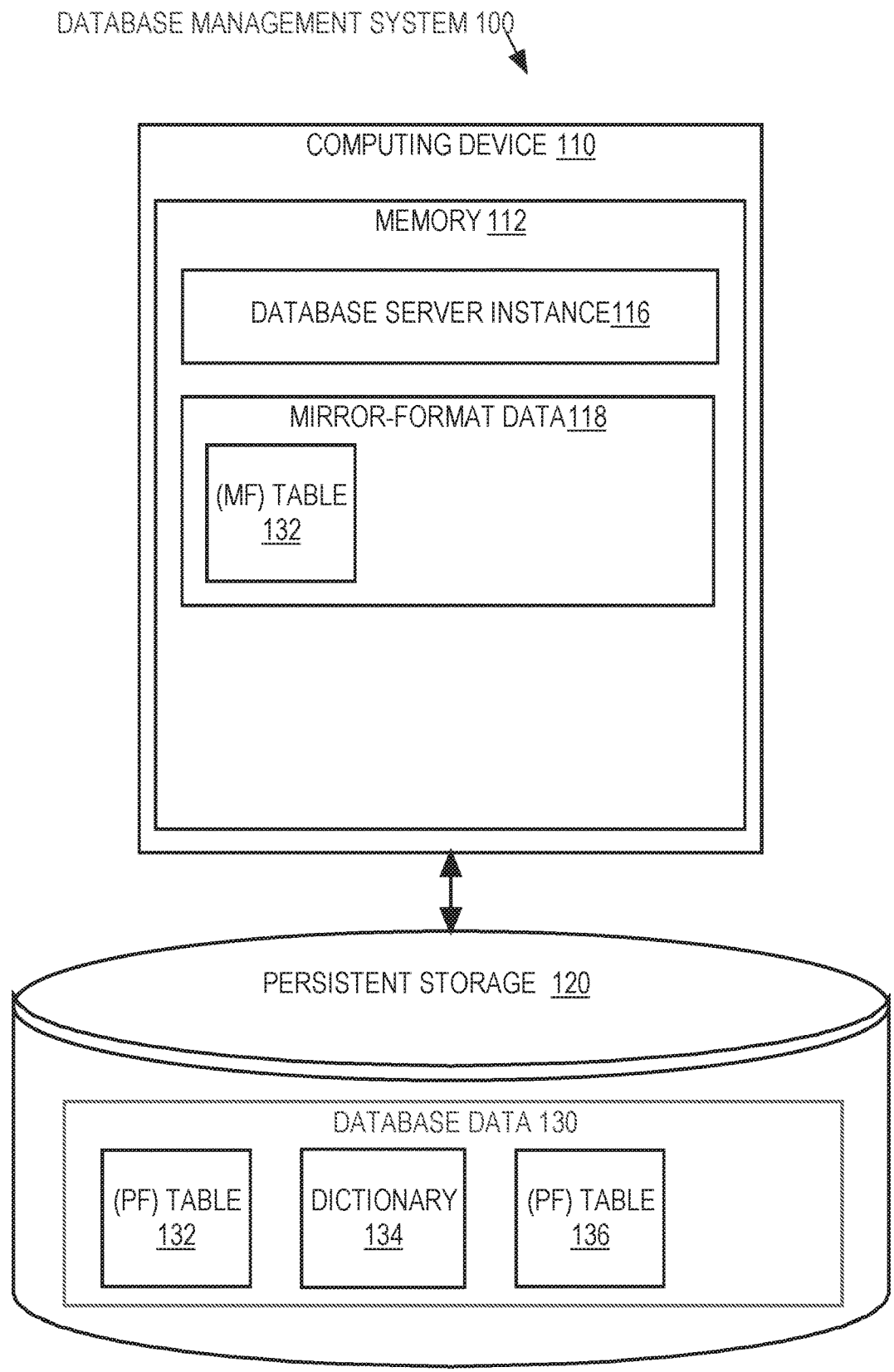
FIG. 1 depicts an example database management system.

In the following description, for the purposes of explanation, numerous specific details are set forth in order to provide a thorough understanding of embodiments. It will be apparent, however, that embodiments may be practiced without these specific details. In other instances, well-known structures and devices are shown in block diagram form in order to avoid unnecessarily obscuring depicted embodiments.

General Overview

Techniques are introduced herein for maintaining spatial database data on persistent storage in a persistent format (PF), and in memory in a mirror format (MF). Specifically, a DBMS that maintains a database table, which includes at least one geometry-type column, also maintains metadata for the database table that includes definition data defining one or more virtual columns of the table. According to an embodiment, the definition data includes one or more expressions that calculate minimum bounding box values for SDOs stored in the geometry-type column in the table. The one or more expressions in the metadata maintained for the table are used to create one or more in-memory columns that materialize the minimum bounding box data for the represented SDOs.

According to an embodiment, a set of in-memory units, referred to herein as "in-memory columnar units (IMCUs)" and "in-memory expression units (IMEUs)", are allocated and maintained by a database server instance in memory accessible by the instance. An IMCU stores a set of column units, where each column unit corresponds to a column that belongs to an on-disk table and includes data items from the corresponding column. An IMEU stores a set of one or more "virtual column units", where each virtual column unit stores pre-computed results that are derived by evaluating an expression on one or more column units also stored in memory. According to an embodiment, an IMCU that materializes a geometry-type column in MF is associated with an IMEU that materializes bounding box information, for the SDOs in the geometry-type column, in MF. According to an embodiment, when information changes in an on-disk table, any portion of an IMCU or IMEU that represents the row with the changed information, or is derived from the row with the changed information, is marked as invalid. Such invalidity may be indicated in an invalidity bitmap, in a journal, etc.

When a query that uses spatial-type operators to perform spatial filtering over data in the geometry-type column is received, the DBMS replaces the spatial-type operators with operators that operate over the scalar bounding box information materialized in MF data. Scan operations over the materialized scalar bounding box values in memory is performed much more efficiently than scan operations over SDOs, even if the geometric data for the SDOs is stored in cache. Furthermore, scan operations over the materialized bounding box values in memory may be performed in parallel, e.g., using Single Instruction, Multiple Data (SIMD) instructions. As such, using operators that operate over the scalar bounding box data materialized in MF data, instead of using SDO operators that perform spatial filtering, increases the speed with which queries over the spatial data may be performed.

Example Database Storing Spatial Data Objects

A spatial data object (SDO) is a complex datatype that is configured to store data defining geometries. For example, SDO_GEOMETRY is a type of SDO that defines geometries using multiple types of data, including scalar values and arrays, among other things. (Additional information about SDO_GEOMETRY is found in "Oracle Spatial User's Guide and Reference," Release 9.2, published March 2002, the entire contents of which is incorporated by reference as if fully set forth herein.)

FIG. 1 depicts an example database management system 100 comprising a computing device 110 with memory 112. According to an embodiment, memory 112 is byte-addressable memory, e.g., random-access memory, or persistent memory (PMEM), which is solid-state byte-addressable memory. In memory 112, device 110 runs a database server instance 116, which manages database data in persistent storage 120 (e.g., database data 130), and in memory 112 (e.g., mirror-format data 118).

Figure 2:
FIG. 2 depicts example virtual columns that store minimum bounding box data for geometries represented in a geometry-type column stored on disk.

FIG. 1 further depicts an example database table 132, which is maintained in persistent format (PF) by database server instance 116 in database data 130 and in mirror format (MF) in memory 112. A database dictionary, such as database dictionary 134 maintained in database data 130 by database server instance 116, provides information about a database being maintained by the DBMS. Such a database dictionary includes definitions of objects in the database, such as tables, views, indexes, etc., and how much space has been allocated for each object in the database. In the example system of FIG. 1, database dictionary 134 defines columns of table 132, as depicted in FIG. 2. Specifically, metadata in database dictionary 134 defines an ID column 202, an SDO column 204, and an SDO NAME column 206 for table 132.

Furthermore, according to an embodiment, metadata in database dictionary 134 further defines one or more virtual columns for table 132, where the definition of each virtual column for table 132 comprises an expression that is applied to data stored in one or more of the materialized columns (202-206) of table 132. FIG. 2 depicts example virtual columns 210-220 that store values defining minimum bounding boxes for geometries represented in SDO column 204 as follows: MIN_X 210, MAX_X 212, MIN_Y 214, MAX_Y 216, MIN_Z 218, MAX_Z 220. The example of FIG. 2 accommodates 3D geometries; however, embodiments are not limited thereto.

Figure 3:
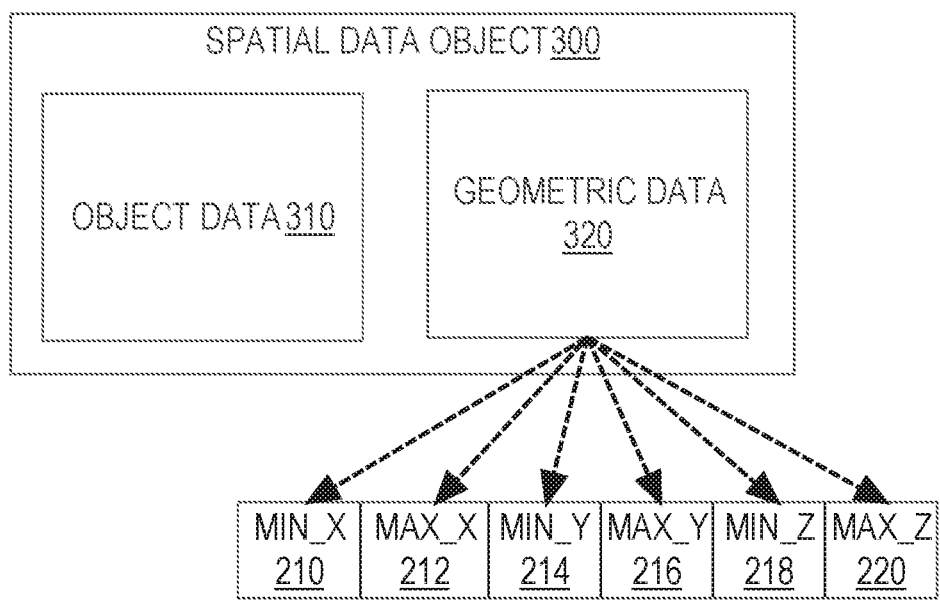
FIG. 3 illustrates an example spatial data object stored in a geometry-type column and corresponding values for virtual columns that represent minimum bounding box information for the represented geometry.

FIG. 3 illustrates an example SDO 300 stored in SDO column 204 and corresponding values for virtual columns 210-220. Specifically, example SDO 300 comprises object data 310 and geometric data 320. Object data 310 describes any aspect of the represented geometry other than the information defining the geometry itself, such as a data source, appearance of the geometry, related data, or other characteristics of the geometry or SDO. Geometric data 320 represents a set of coordinates that define the represented geometry, e.g., with respect to an origin of a three-dimensional "map".

Spatial Filtering

Using geometric data stored in an SDO, a DBMS can determine aspects of the geometry defined by the geometric data, and can compare the geometry with other geometries. For example, spatial filters may be used to determine spatial relationships between geometries represented by SDOs in a database. According to an embodiment, the spatial relationship between geometries is based on geometry locations. The most common spatial relationships are based on topology and distance. For example, the boundary of a geometry comprises a set of curves that separates the geometry from the rest of the coordinate space. The interior of a geometry comprises all points in the geometry that are not on its boundary. The exterior of a geometry comprises all points that are not in the interior of the geometry and that are not on its boundary, Given this, two geometries are said to be adjacent if they share part of a boundary but do not share any points in their respective interiors and, accordingly, do share all points in their respective exteriors.

The distance between two geometries is the minimum distance between any points in them. Two geometries are said to be within a given distance of one another if their distance is less than the given distance. The following are example operators representing filter methods to determine spatial relationships between geometries:

The SDO_RELATE operator evaluates topological criteria.

The SDO_WITHIN_DISTANCE operator determines if two geometries are within a specified distance of each other.

The SDO_NN operator identifies the nearest neighbors for a geometry.

Figure 4:
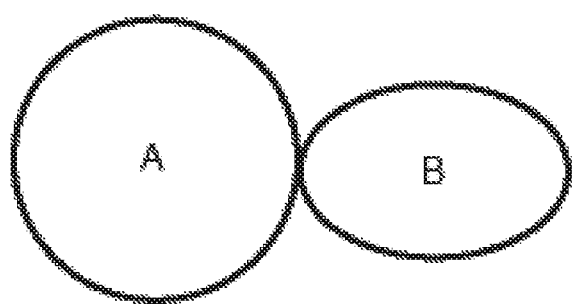
FIG. 4 depicts an intersection matrix for two polygons A and B that are adjacent to one another.

According to an embodiment, the SDO_RELATE operator implements a nine-intersection model for categorizing binary topological relationships between points, lines, and polygons. Given that a geometry A has three components (a boundary Ab, an interior Ai, and an exterior Ac), any pair of geometries has nine possible interactions between their components. Pairs of components have an empty (0) or not empty (1) set intersection. The set of interactions between two geometries is represented by a nine-intersection matrix that specifies which pairs of components intersect and which do not. FIG. 4 depicts a nine-intersection matrix for two polygons A and B that are adjacent to one another. This matrix yields the following bit mask (e.g., generated in row-major form): "101001111"

Some of the topological relationships identified in the seminal work by Professor Max Egenhofer (University of Maine, Orono) and colleagues have names associated with them, including:

DISJOINT: The boundaries and interiors do not intersect.

TOUCH: The boundaries intersect but the interiors do not intersect.

OVERLAPBDYDISJOINT: The interior of one geometry intersects the boundary and interior of the other geometry, but the two boundaries do not intersect. This relationship occurs, for example, when a line originates outside a polygon and ends inside of the polygon.

OVERLAPBDYINTERSECT: The boundaries and interiors of the two geometries intersect.

EQUAL: The two geometries have the same boundary and interior.

CONTAINS: The interior and boundary of one geometry is completely contained in the interior of the other geometry, COVERS: The boundary and interior of one geometry is completely contained in the interior or the boundary of the other geometry, their interiors intersect, and the boundary or the interior of one geometry and the boundary of the other geometry intersect.

INSIDE: The opposite of CONTAINS. A INSIDE B implies B CONTAINS A.

COVEREDBY: The opposite of COVERS. A COVEREDBY B implies B COVERS A.

ON: The interior and boundary of one geometry is on the boundary of the other geometry. This relationship occurs, for example, when a line is on the boundary of a polygon.

ANYINTERACT: The geometries are non-disjoint.

Materializing Minimum Bounding Box Information in Memory to Speed Up Spatial Filtering The SDO data that is stored in the in-memory columnar units is scalar minimum bounding box data. According to an embodiment, one or more expressions maintained in a database dictionary that define virtual columns based on SDO data stored in a database table are used to create one or more in-memory columns that materialize the minimum bounding box data for the represented SDOs. This minimum bounding box information may be used to speed up filtering processing over SDOs, thereby conserving computing resources. Accordingly, when a query that uses spatial-type operators to perform spatial filtering over data in a geometry-type column storing SDOs is received, the DBMS replaces the spatial-type operators with operators that operate over the scalar bounding box information materialized in MF data. Scanning the scalar bounding box information in MF data is an inexpensive operation, which increases the efficiency of performing spatial filtering when compared to performance of the spatial filtering operators that operate over SDOs.

FIG. 5 depicts a flowchart 500 for materializing, in memory, one or more in-memory columns based on expressions, in definitions of virtual columns, that derive values from geometric data materialized on disk, and using the in-memory columns for a query over the geometric data. Specifically, at step 502, a first table that stores a plurality of columns that comprises one or more geometry-type columns is maintained on disk by a database management system, where the database management system maintains metadata defining the plurality of columns, where said metadata includes a definition of one or more virtual columns of said plurality of columns, and where the definition comprises one or more expressions that derive values for the one or more virtual columns from the one or more geometry-type columns. For example, database server instance 116 maintains, in persistent storage 120, database data 130 that comprises a table 132 in persistent format, and also a database dictionary 134. Database dictionary 134 includes metadata that defines materialized columns 202-206 (FIG. 2) of table 132, which includes SDO column 204 that stores SDOs.

Table 132 is altered to add virtual columns 210-220 using SQL for 3D geometry as follows:

```
ALTER TABLE table_132
ADD (MAX_X_COLUMN_210 INVISIBLE AS (SDO_GEOM_MAX_X(SDO)));
ALTER TABLE table_132
ADD (MIN_X_COLUMN_212 INVISIBLE AS (SDO_GEOM_MIN_X(SDO)));
ALTER TABLE table_132
ADD (MAX_Y_COLUMN_214 INVISIBLE AS (SDO_GEOM_MAX_Y(SDO)));
ALTER TABLE table_132
ADD (MIN_Y_COLUMN_216 INVISIBLE AS (SDO_GEOM_MIN_Y(SDO)));
ALTER TABLE table_132
ADD (MAX_Z_COLUMN_218 INVISIBLE AS (SDO_GEOM_MAX_Z(SDO)));
ALTER TABLE table_132
ADD (MIN_Z_COLUMN_220 INVISIBLE AS (SDO_GEOM_MIN_Z(SDO)));
```

According to an embodiment, the SDO_functions included herein are part of a SQL spatial extension for standard SQL. By these SQL statements, database dictionary 134 is altered to include metadata that defines virtual columns 210-220 of table 132, which, according to an embodiment, are not materialized in persistent storage 120. The definitions for virtual columns 210-220, in dictionary 134, include the indicated expressions that derive the respective maximum/minimum values for the three dimensions from geometric data stored in SDO column 204, thereby representing the minimum bounding boxes for the SDOs in SDO column 204. These functions scan whole SDOs stored in SDO column 204.

Representing SDO in Mirror-Format Data

At step 504 of flowchart 500, a set of in-memory columns are created, where the set of in-memory columns materializes results of the one or more expressions based on the one or more geometry-type columns. For example, while instance 116 maintains table 132 in persistent format in database data 130, and dictionary 134 includes metadata that defines virtual columns 210-220 as indicated above, instance 116 executes the data definition language (DDL) statement "ALTER TABLE table_132 inmemory priority critical".

Execution of this DDL statement causes data from table 132 to also be maintained in in-memory columnar units in mirror-format data 118. Specifically, in connection with executing this statement, instance 116 implicitly adds MF data that materializes the results of the expressions defining virtual columns 210-220. Thus, MF data 118 stores pre-computed results (PCRs) of one or more expressions defining virtual columns 210-220. According to an embodiment, these PCRs for the expressions that define virtual columns 210-220 are materialized in mirror format data 118 based on a determination that these expressions define minimum bounding box information for SDOs in table 132.

In various embodiments, computer systems, stored instructions, and technical steps are described for capturing and processing in-memory expressions (IMEs). An IME, as used herein, is broadly classified as any expression for which the results have been pre-computed and cached in volatile memory, such as the expressions in database dictionary 134 that define virtual columns 210-220. The PCRs of an IME may be maintained in memory (e.g., in cache or in mirror-format data 118) and persistently-stored, or may exist only in memory (without any persistently-stored copy). PCRs may include results computed at different levels of granularity, which provides flexibility during query optimization and execution.

In order to store PCRs of IMEs, a set of in-memory units, referred to herein as "in-memory columnar units (IMCUs)" and "in-memory expression units (IMEUs)", are allocated and maintained by a database server instance, as described in further detail below. An IMCU stores a set of column units, where each column units corresponds to a column that belongs to an on-disk table within a database managed by a database server instance, and includes data items from the corresponding column. An IMEU stores a set of one or more "virtual column units", where each virtual column unit may store PCRs that are derived by evaluating an expression on one or more column units also stored in memory. A pointer and/or other association data is stored in volatile or non-volatile memory (e.g., in the header of the IMCU) to associate the set of column units with the set of virtual column units. Queries against the IMCU may access PCRs from the set of virtual columns rather than re-computing the expression results.

Figure 6:
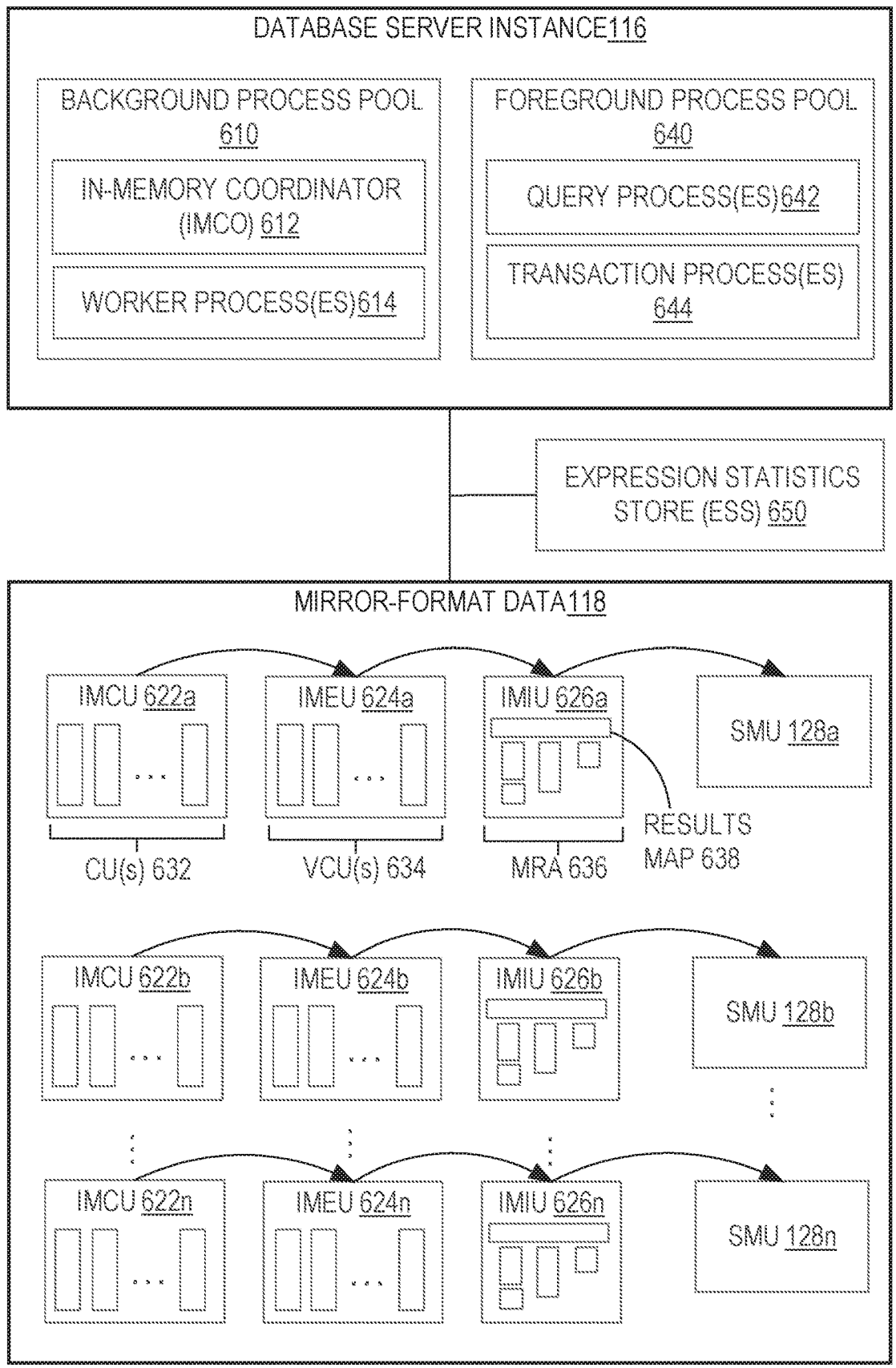
FIG. 6 is a block diagram depicting an example system design for creating and maintaining in-memory units that cache results of expression evaluations and internal computations.

When the instruction to store table 132 in memory is executed, PCRs comprising minimum bounding box values for SDO column 204 are loaded into IMEU stores. To illustrate, FIG. 6 depicts an example system design for creating and maintaining in-memory units that cache results of expression evaluations. In this example, instance 116 loads data, including SDOs in SDO column 204, in table 132 in database data 130 into example IMCU 622a maintained in mirror-format data 118. Instance 116 also materializes, in IMEU 624a, PCRs based on expressions that are included in the definitions for virtual columns 210-220 in metadata for table 132 in database dictionary 134.

As described in further detail below, PCRs are similar to columns in that the PCRs of a given expression include a single value per row. Consequently, PCRs can be considered virtual columns, and the structures that stores PCRs are referred to herein as "virtual column units" or VCUs, such as VCUs 634 of FIG. 6. Because the values in VCUs 634—which represent the minimum bounding boxes for SDO data in table 132—are binary double datatype columns (according to an embodiment), they are subject to usual columnar compression and scanning techniques.

Running a Query Over Spatial Object Data Using Mirror-Format Data

Returning to the discussion of flowchart 500, at step 506, the database management system compiles a query that includes a particular operator that operates on the one or more geometry-type columns, where said compiling comprises rewriting the query to generate a rewritten query that includes at least one expression of the one or more expressions. For example, instance 116 receives the following query, Query 1, over table 132:

Query 1:

```
SELECT table_132.SDO_NAME
FROM table_132
WHERE sdo_filter(table_132.SDO, SDO_geometry(2002, NULL, NULL,
            SDO_elem_info_array(1, 2, 1), SDO_ordinate_array(10 ,14, 15, 11)))
        = 'TRUE';
```

It is noted that Query 1 includes an operator, SDO_FILTER( ) that operates over SDO column 204 in table 132. It is further noted that, for the sake of simplicity, Query 1 refers to two dimensions of geometries in SDO column 204.

According to an embodiment, Query 1 is intercepted, e.g., by a SQL compiler, at compile time for the query, such that instance 116 transforms the SDO_FILTER( ) operator in Query 1 autonomously. Specifically, instance 116 determines that Query 1 includes a geometry-specific operator, i.e., the SDO_FILTER( ) operator, which operates over SDO column 204 of table 132. Instance 116 determines that SDO column 204 is the subject of IMEs, PCRs of which are materialized in mirror-format data 118. Based on this determination, instance 116 automatically rewrites Query 1 to include the IMEs, as depicted in the following rewritten query, Query 2:

Query 2:

```
SELECT table_132.SDO_NAME
FROM table_132
WHERE sdo_geom_min_x(table_132.SDO) >= 10 AND
        sdo_geom_max_x(table_132.SDO) <= 14 AND
        sdo_geom_min_y(table_132. SDO) >= 11 AND
        sdo_geom_max_y(table_132.SDO) <= 15;
```

Query 2 is semantically equivalent to Query 1 because the results of Query 2 are equivalent to the results of Query 1. Specifically, the result of either query returns the same rows but not necessarily in the same order.

At step 508 of flowchart 500, the rewritten query is executed, where said executing the rewritten query comprises: (a) detecting the at least one expression in the rewritten query; (b) based on said detecting the at least one expression in the rewritten query, performing one or more tasks, required by the particular operator, based on the set of in-memory columns; and (c) returning a result data set. For example, instance 116 executes Query 2 above. During execution, an optimizer for instance 116 detects, in Query 2, one or more expressions that match IMEs for IMEU 624. Based on the detection of the IMEs in Query 2, the query optimizer decides to utilize an in-memory scan over IMEU 624 for execution of the query. Thus, instance 116 implements the query, at least partly, using a range scan over the minimum bounding box scalar values materialized in the VCUs of IMEU 624a. Instance 116 returns the results of Query 2 to the user as the results of the originally-submitted Query 1.

During run time for a rewritten query, such as Query 2, if the virtual column expression values are fully loaded into the in-memory store, then the PCRs with minimum bounding box values are directly fetched from in-memory store, e.g., at IMEU 624a, and the range queries over them become SIMD scans, as described in further detail below.

However, in the case that not all of the PCRs for expressions that define virtual columns 210-220 are materialized in mirror-format data 118, instance 116 utilizes the functional evaluation code path by computing the virtual column expression values from the expressions that define virtual columns 210-220, i.e., based on data stored in SDO column 204 in database data 130. This is aligned with in-memory computation paths that are implemented when there is not enough memory to hold all required values in memory.

For example, after execution of Query 1, rewritten as Query 2, memory pressure causes the PCRs of the one or more of the IMEs that derive data from geometries in SDO column 204, e.g., one or more of IMEUs 624a-624n in mirror format data 118, to be removed from memory 112. Subsequent to the removal of the PCRs, instance 116 receives a Query 3 that includes an SDO_FILTER( ) operator that operates over SDO column 204 in table 132.

As with Query 1 above, at compile time for Query 3, instance 116 determines that Query 3 includes an SDO_FILTER( ) operator that operates over SDO column 204 of table 132. Instance 116 determines that SDO column 204 is the subject of IMEs, PCRs of which are materialized in mirror-format data 118. Based on this determination, instance 116 automatically rewrites Query 3 to a Query 4 that is semantically equivalent to Query 3, and that includes the IMEs. However, in this case, during run-time of Query 4, instance 116 determines that the PCRs of the IMEs referred to in Query 4 are not stored in mirror-format data 118. In response to this determination, instance 116 transparently reverts to executing the expressions in Query 4 based on SDO column 204 stored in database data 130.

The minimum bounding box information may be used to perform spatial filtering for certain kinds of topological relationships, such as to determine geometries that have the relationship OVERLAPBDYINTERSECT. Specifically, minimum bounding boxes of two geometries that OVERLAPBDYINTERSECT will necessarily overlap, but will not be equal. In this case, the minimum bounding box information for the geometries is sufficient to determine definitively whether the geometries satisfy the relationship.

Furthermore, some types of spatial filtering utilize minimum bounding box information as a preliminary step for determining whether geometries satisfy the spatial operations. In these cases, the minimum bounding box information in MF data 118 may be used as a preliminary filter for spatial object relationships in that the minimum bounding box information may be used to identify candidate SDOs that may satisfy a given operation and eliminate, from consideration for the operation, those SDOs that are not candidates.

For example, a particular query requests all spatial objects, in SDO column 204 of table 132, that TOUCH a particular geometry. The minimum bounding box information, stored in the IMEUs in mirror-format data 118, is compared to the minimum bounding box for the particular geometry. Any geometries in SDO column 204 whose minimum bounding boxes share a value without overlapping the minimum bounding box for the particular geometry could potentially satisfy the query, depending on the particulars of the geometries, and, as such, are identified as candidate geometries for the filter operation, Instance 116 retrieves, from persistent format data (either in persistent storage 120 or in a cache), the spatial objects from SDO column 204 that are candidates for satisfying the requested topological relationship with the particular geometry. In this way, retrieval and evaluation of spatial Objects that could not satisfy the query is avoided, which, in most cases, greatly increases the speed of query execution.

Simd Scans

After the SDO operator is replaced with an operator that operates over the scalar minimum bounding box data, according to an embodiment, SIMD scans, such as scans that may be implemented using the instructions of AVX-512 instruction sets, are performed on the PCRs in the applicable one or more IMEUs. SIMD architectures allow computers with multiple processing elements to simultaneously perform the same operation on multiple data points. SIMD architectures may perform mainly "vertical" operations where corresponding elements in separate operands are operated upon in parallel and independently. Unlike vertical SIMD instructions, horizontal SIMD instructions are performed across the elements of a SIMD register. SIMD instructions allow the execution alignment of the same operation on multiple data elements at once.

According to an embodiment, parallel performance of operations over the minimum bounding box values is facilitated by storing point definitions in columnar format. When data is stored in columnar format, value is stored separately from other values or properties of the polygon, and together with respective properties, of the same type, from other SDOs. For example, all of the MAX_X values from every SDO in table 132 are stored together in a contiguous memory section. This allows application of special Central Processing Unit (CPU)/Graphics Processing Unit (GPU) operations in several (contiguous) elements at the same time. Columnar format is a database concept, and, in a more general scope, it is equivalent to "Structure of Arrays" (SoA) memory arrange, in contrast with "Array of Structures" (AoS) that is not SIMD friendly.

Computations described above may be performed in parallel on a highly parallel architecture such as a graphics processing unit (GPU) or another SIMD architecture with or without distributed memories. Because of the speed of SIMD scans that perform spatial object filtering using the materialized IMEs in the IMEUs, embodiments do not require construction and maintenance of indexes to speed spatial filtering queries. In this way, processing required to construct and maintain such an index is not required, according to embodiments.

Mirror-Format Data and Persistent-Format Data

The format that corresponds to the on-disk format is referred to herein as the "persistent format" or "PF". Data that is in the persistent format is referred to herein as PF data. An in-memory format that is independent of the on-disk format is referred to as a "mirror format" or "MF". Data that is in the mirror format is referred to herein as MF data. For example, in one embodiment, the persistent format is row-major disk blocks, and the mirror format is a column-major format.

According to one embodiment, the mirror format is completely independent of the persistent format. However, the MF data is initially constructed in memory based on the persistently stored PF data, not based on any persistent MF structures. Since persistent MF structures are not required, users of existing databases need not migrate the data or structures in their existing databases to another format. Thus, a conventional database system that uses row-major disk blocks may continue to use those disk blocks to persistently store its data without performing any data migration, while still obtaining the performance benefit that results from having a column-major representation of the data available in volatile memory.

In-memory MF data is maintained transactionally consistent with the PF data. The MF data is transactionally consistent in that any data items provided to a transaction from the MF data will be the same version that would have been provided if the data items were provided from the PF data. Further, that version reflects all changes that were committed before the snapshot time of the transaction, and no changes that were committed after the snapshot time of the transaction. Thus, when a transaction, that made a change to a data item that is mirrored in the MF data, is committed, the change is made visible relative to both the PF data and the MF data. On the other hand, if a transaction that made a change is aborted or rolled back, then the change is rolled back relative to both the PF data and the MF data.

In one embodiment, the same transaction manager that ensures consistency among the reads and writes of the PF data is also used to ensure consistency among the reads and writes of the MF data. Because the MF data is kept current in a transactionally consistent manner, if the in-memory MF data includes the data required by a database operation, then the database operation may be satisfied either from the in-memory MF data, or from the PF data.

The MF data mirrors data that already exists in the PF data. However, while all items in the MF data are mirror versions of corresponding items in the PF data (albeit organized in a different format), not all items in the PF data need be mirrored in the MF data. Thus, the MF data may be a subset of the PF data.

Because not all of the PF data is necessarily mirrored in the MF data, in some situations queries may require data that can only be satisfied by the PF data. For example, if a table has columns A, B and C, and only column A is mirrored in the MF data, then a query that requires values from column B must obtain those values from the PF data.

However, even in those circumstances, the MF data may still be used to (a) satisfy a portion of the query, and/or (b) speed up the retrieval of required data from the PF data. For example, the MF data may be used to identify the specific rows that must be retrieved from the PF data.

According to one embodiment, to reduce overhead, no on-disk copy of the MF data is maintained. In an alternative embodiment, a copy of the MF may be stored, but no attempt is made to keep the on-disk copy of the MF data in sync with updates that are being performed on the PF data. Consequently, after a failure, the in-memory MF data must be reconstructed based on the persistent copy of the PF data.

In some embodiments, the MF data is compressed. The compression can be performed at various compression levels, either specified by the user or based on access patterns.

While examples shall be given hereafter in which the mirror format is columnar, the mirror format may be any format, different from the persistent format, that is useful for running in-memory queries. For example, in an alternative embodiment, the PF format is column-major, while the MF format is row-major. Regardless of the particular mirror format used, the mirror format data is created in memory based on existing PF structures (e.g. tables and indexes) without causing a change to the format of those structures.

System Overview

A database client, not depicted in FIG. 1, connects to database management system 100. The client may comprise a database application running on a client node. The client interacts with an instance of database system 100, such as instance 116, by submitting commands that cause the instance to perform operations on data stored in the database. For example, a command may be a request to access or modify data from the database, perform operations on the data, and/or return the data to the client.

Database system 100 may be implemented by a single machine, e.g., device 110, or may be implemented by multiple machines that are communicatively connected. Referring to FIG. 1, database server instance 116, running on device 110, maintains database data 130 in persistent storage 120.

According to an embodiment, device 110 may be referred to as a machine node, and runs database server instance 116. A database server instance (or "instance") is a server that comprises a combination of the software and allocation of resources from a machine node. Specifically, a server, such as a database server, or any other process is a combination of integrated software components and an allocation of computational resources, such as memory, a machine node (i.e., a computing device and/or memory accessible to the computing device), and/or sub-processes on the machine node for executing the integrated software components on a processor, the combination of the software and computational resources being dedicated to performing a particular function on behalf of one or more clients. In the embodiment depicted in FIG. 1, instance 116 implements server-side functions of database system 100.

Database data 130 may reside in volatile and/or non-volatile storage, such as memory 112, persistent storage 120, etc. Each machine node implementing database system 100 may include a virtual disk and/or a set of physical disks. Additionally, or alternatively, database data 130 may be stored, at least in part, in main memory of a database server computing device.

One or more of the functions attributed to any process described herein, may be performed by any other logical entity that may or may not be depicted in FIG. 1, according to one or more embodiments. In an embodiment, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Database queries include constructs referred to as expressions, where an expression is typically a combination of one or more values, operators, and/or functions. During query execution, a database server instance evaluates the query expressions to produce a query result. Query expressions may cause a database server instance to perform a variety of operations such as filtering, projecting, aggregating, sorting, or otherwise manipulating values stored within a database object. Some query expressions require process-intensive operations that consume a significant amount of resources per evaluation. In fact, analytic queries often contain complex expressions or calculations that can consume a large amount of system resources during execution. By automatically identifying these frequently used complex expressions or calculations and caching their results, a database server may improve query performance and increase scalability by reducing repeated computations and thus, reducing the system resources consumed during execution. In addition, query processing on certain data-types can be improved by storing an efficient in-memory optimized representation.

In an embodiment, a database server comprises an IME framework. The IME framework supports a variety of functions for capturing and processing IMEs including, without limitation Identifying expressions and other computations for in-memory materialization;
  Creating and maintaining in-memory units for caching IMEs and other computations; and
  Querying the in-memory units for faster projection and predicate evaluation.

FIG. 6 is a block diagram depicting an example system design for creating and maintaining in-memory units that cache results of expression evaluations and internal computations, according to an embodiment. Database server instance 116 includes background process pool 610, mirror-format data 118, expression statistics store 650, and foreground process pool 640.

Background process pool 610 includes a plurality of background processes, including in-memory coordinator (IMCO) 612 and worker processes 614, which are responsible for performing background tasks within mirror-format data 118. In an embodiment, background population and other tasks for the background processes are enqueued as they arise. IMCO 612 may then coordinate execution of these tasks with worker processes 614. IMCO 612 may assign and balance tasks amongst worker processes 614, which may perform certain tasks in parallel.

According to an embodiment, the database server instance also maintains in-memory units referred to herein as "in-memory internal units (IMIUs)". IMIUs store a set of metadata values for computations that are being tracked by a database server instance. The IMIU may further store one or more sets of results for one or more computations. In an embodiment, responsive to the database server instance receiving a query, the database server instance identifies a set of computations for evaluation during execution of the query. Responsive to identifying the set of computations, the database server instance evaluates at least one computation in the set of computations to obtain a first set of results for a first computation in the set of computations. After evaluating at least one computation, the database serverinstance stores, within an in-memory unit, the first set of computation results. The database server also stores mapping data that maps a set of metadata values associated with the first computation to the first set of computation results. If subsequent queries are received that involve the computation, the database server instance may access the cached computation results from IMIU rather than re-evaluating the computation.

In the example configuration of FIG. 6, example mirror-format data 118 stores a plurality of in-memory units including IMCUs 622a to 622n, in-memory expression units IMEUs 624a to 624n, in-memory internal units IMIUs 626a to 626n, and shared metadata units (SMUs) 628a to 628n. Each in-memory unit may comprise one or more contiguous chunks of memory, referred to herein as "in-memory extents", that are specifically allocated for the unit. Metadata that defines the various attributes of the in-memory units may also be maintained by database server instance 116. For instance, the metadata may include, without limitation, extent lists that identify which in-memory extents belong to a particular in-memory unit, free space pointers that point to available storage space within the unit, and identifiers that uniquely identify each in-memory unit. Each of the different types of in-memory units is described in further detail below.

Foreground process pool 640 includes a set of foreground processes that are responsible for processing queries as they are received. The foreground processes include query processes 642, which perform tasks such as query compilation, query execution plan generation and optimization, parallel query coordination, and query execution. The foreground processes further include transaction processes 644, which maintain the atomicity and consistency of database transactions with respect to mirror-format data 118.

Expression statistics store (ESS) 650 tracks various statistics and other metadata values for expressions that have been submitted in queries. Although depicted as residing outside of mirror-format data 118, in some implementations, ESS 650 may be maintained, in whole or in part, within mirror-format data 118. In addition, or alternatively, ESS 650 may be stored persistently on disk or in some other non-volatile storage media.

Expression Evaluation

During query execution, query processes 642 may evaluate one or more query expressions that are included within a query. An "expression" in this context refers to a query construct that specifies one or more operations and one or more operands on which the one or more operations are performed. The operations may be specified using a set of commands, such as structured query language (SQL) statements, mathematical operators, etc. The operands may correspond to objects, such as columns and column functions, constants, or other values. As an example, the expression "a*b" includes the operands "a" and "b", which correspond to different columns in a table. The expression further includes the multiplication operator "*", which causes a database server instance to multiply values from columns "a" and "b" when evaluating the expression.

As a further example, the expression "sdo_geom_min_x (a)" includes the operand "a", which is an identifier of a column in particular table that is a geometry-type column, and the operator "sdo_geom_min_x", which causes a database server instance to identify a minimum value on the x axis for SDOs in the indicated column. The combination and types of operators used may vary widely between different query expressions.

Expressions may occur in various locations within a database query. In a SQL statement, for instance, expressions may exist in a select list, aggregation function, a SQL clause, or within some other SQL construct.

In-Memory Columnar Units

IMCUs 622a to 622n each store a set of one or more column units (CUs), such as CUs 632, which correspond to one or more on-disk columns that belong to one or more on-disk tables, such as table 132, within a database managed by database server instance 116. Conceptually, each of IMCUs 622a to 622n divides the rows of a table into separate chunks. The rows within a chunk are converted to a mirror format, such as column-major format, and may be compressed based on a chosen in-memory format. The rows of the chunk are then loaded into an IMCU as one or more CUs, where the CUs adhere to the in-memory format. As an example, IMCU 622a may include a first set of one or more column units, where each column unit corresponds to a different respective column of table 132 and stores a first set of rows in the table (such as the first million rows) for the respective column in compressed or uncompressed mirror format. Similarly, IMCU 622b may comprise a second set of one or more column units, where each column unit in the second set corresponds to a different respective column of table 132 and stores the second set of rows for the respective column in compressed or uncompressed format. The remaining rows of table 132 may similarly be divided into chunks and cached in other IMCUs within mirror-format data 118.

In-Memory Expression Units

Each of IMEUs 624a to 624n is an in-memory cache where IMEs are stored for future reuse to improve query performance. In an embodiment, database server instance 116 allocates a fixed amount of memory for IMEUs 624a to 624n in an on-demand basis and maintains each of IMEUs 624a to 624n as a bounded cache. Once space is allocated for an IMEU, database server instance 116 identifies expressions that will benefit from caching and stores the evaluation results for the IME in one or more of IMEUs 624a to 624n.

An IMEU may be implemented as a logical extension of an IMCU. An IMCU that an IMEU logically extends is herein referred to as a "parent" IMCU. Within the parent IMCU, mapping data, such a pointer, is maintained within the IMCU header to link the set of CUs maintained in the IMCU with the expression results cached in the IMEU. The IMEU may also store a back pointer to the parent IMCU, depending on the particular implementation. During scan operations on the IMCU, the pointer may be used to identify the corresponding IMEU and any expression results cached therein. Each of IMEUs 624a to 624n thus acts as a per-IMCU container for storing expression results for the parent IMCU.

In an embodiment, database server instance 116 may automatically allocate space for IMEUs 624a to 624n to extend the corresponding parent IMCUs. For instance, when an IMCU is created for a particular segment that has been enabled for in-memory storage, a corresponding IMEU may also be created and mapped to the newly created IMCU. If the parent IMCU is dropped from memory, then the corresponding IMEU may also dropped from memory.

In an embodiment, each IMEU stores PCRs for expressions that operate on one or more columns corresponding to the column units stored in the parent IMCU. As an example, IMCU 622a stores values for rows one to ten of SDO column 204 of table 132 while IMCU 622b stores values from rows eleven to twenty from the same table column. If the expression "sdo_geom_min_x(table_132.SDO)" is identified as an IME, then IMCU 622a includes a pointer to IMEU 624a, which stores PCRs of "sdo_geom_min_x (table_132.SDO)" for the first ten rows. IMCU 622b includes a pointer to IMEU 624b, which stores the expressions results of "sdo_geom_min_x(table_132.SDO)" for the next ten rows. Similarly, other rows from the operand column and PCRs for the IME may respectively be distributed across different IMCUs and IMEUs.

Virtual Column Units

PCRs are similar to columns in that the PCRs of a given expression include a single value per row. Consequently, PCRs can be considered virtual columns, and the structures that stores PCRs are referred to herein as "virtual column units" or VCUs. In an embodiment, each of IMEUs 624a to 624n stores PCRs as a set of one or more virtual column units. A VCU may store values from the PCRs of an expression in compressed or uncompressed one-result-value-per-row format. As an example, database server instance 116 derives a column vector in response to evaluating the expression "sdo_geom_min_x(table_132.SDO)", where each row in the column vector includes a result value obtained by determining the minimum value of the geometry represented by the respective SDOs on the x axis. Thus, the first row in the column vector is the minimum x-axis value of the geometry represented by the first SDO in SDO column 204, the second row in the column vector is the minimum x-axis value of the geometry represented by the second SDO in SDO column 204, etc. If the expression "sdo_geom_min_x(table_132.SDO)" is identified for caching, then the database server instance creates, within an IMEU, a virtual column unit that stores the PCRs for "sdo_geom_min_x(table_132.SDO)" such that consecutive values within the column vector are stored contiguously in memory.

A virtual column may be comprised of multiple VCUs that are distributed across different IMEUs. This scenario may occur where actual columns of a table that serve as operands to an expression are distributed across different IMCUs. As an example, IMCU 622a may store the first one hundred rows of SDO column 204 from table 132, and IMCU 622b may store the second one hundred rows of SDO column 204 from table 132. In order to cache the PCRs for the expression "sdo_geom_min_x(table_132.SDO)", a database server instance may store a first virtual column unit in IMEU 624a that contains the PCRs for the first hundred rows and a second virtual column unit in IMEU 624b that contains the PCRs for the second hundred rows. Other virtual column units that belong to the same virtual column may be distributed across other IMEUs such that the virtual column units maintain a one-to-one relationship between the number of rows in the virtual column unit and the number of rows in the column units of the associated IMCU.

When an IMEU caches PCRs for a single IME, a single VCU may be used to store the PCRs. If the IMEU caches PCRs for multiple IMEs, then the IMEU may store PCRs across multiple VCUs, where different VCUs store the PCRs for different IMEs. For instance, IMEU 624a stores VCUs 634, which may include a first virtual column unit materializing PCRs for a first expression (e.g., "sdo_geom_min_x(table_132.SDO)") and one or more additional virtual column units that materialize the PCRs for additional expressions (e.g., "sdo_geom_max_x(table_132.SDO)", "sdo_geom_min_y(table_132.SDO)", etc.). VCUs 634 may logically extend the CUs maintained within the parent IMCU per the mapping data that is maintained to link the parent IMCU to the IMEU.

Database Overview

Embodiments of the present invention are used in the context of database management systems (DBMSs). Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g., Oracle Database 11 g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/WL is a common extension of SQL used when manipulating XML data in an object-relational database.

Generally, data is stored in a database in one or more data containers, each container contains records, and the data within each record is organized into one or more fields. In relational database systems, the data containers are typically referred to as tables, the records are referred to as rows, and the fields are referred to as columns. In object-oriented databases, the data containers are typically referred to as object classes, the records are referred to as objects, and the fields are referred to as attributes. Other database architectures may use other terminology. Systems that implement the present invention are not limited to any particular type of data container or database architecture. However, for the purpose of explanation, the examples and the terminology used herein shall be that typically associated with relational or object-relational databases. Thus, the terms "table", "row" and "column" shall be used herein to refer respectively to the data container, record, and field.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g., work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

A client may issue a series of requests, such as requests for execution of queries, to a DBMS by establishing a database session. A database session comprises a particular connection established for a client to a database server through which the client may issue the series of requests. A database session process executes within a database session and processes requests issued by the client through the database session. The database session may generate an execution plan for a query issued by the database session client and marshal slave processes for execution of the execution plan.

The database server may maintain session state data about a database session. The session state data reflects the current state of the session and may contain the identity of the user for which the session is established, services used by the user, instances of object types, language and character set data, statistics about resource usage for the session, temporary variable values generated by processes executing software within the session, storage for cursors, variables and other information.

A database server includes multiple database processes. Database processes run under the control of the database server (i.e., can be created or terminated by the database server) and perform various database server functions. Database processes include processes running within a database session established for a client.

A database process is a unit of execution. A database process can be an computer system process or thread or a user defined execution context such as a user thread or fiber. Database processes may also include "database server system" processes which provide services and/or perform functions on behalf of entire database server. Such database server system processes include listeners, garbage collectors, log writers, and recovery processes.

A database dictionary may comprise multiple data structures that store database metadata. A database dictionary may for example, comprise multiple files and tables. Portions of the data structures may be cached in main memory of a database server.

When a database object is said to be defined by a database dictionary, the database dictionary contains metadata that defines properties of the database object. For example, metadata in a database dictionary defining a database table may specify the column names and datatypes of the columns, and one or more files or portions thereof that store data for the table. Metadata in the database dictionary defining a procedure may specify a name of the procedure, the procedure's arguments and the return datatype and the datatypes of the arguments, and may include source code and a compiled version thereof.

A database object may be defined by the database dictionary, but the metadata in the database dictionary itself may only partly specify the properties of the database object. Other properties may be defined by data structures that may not be considered part of the database dictionary. For example, a user defined function implemented in a JAVA class may be defined in part by the database dictionary by specifying the name of the users defined function and by specifying a reference to a file containing the source code of the Java class (i.e., java file) and the compiled version of the class (i.e., class file).

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
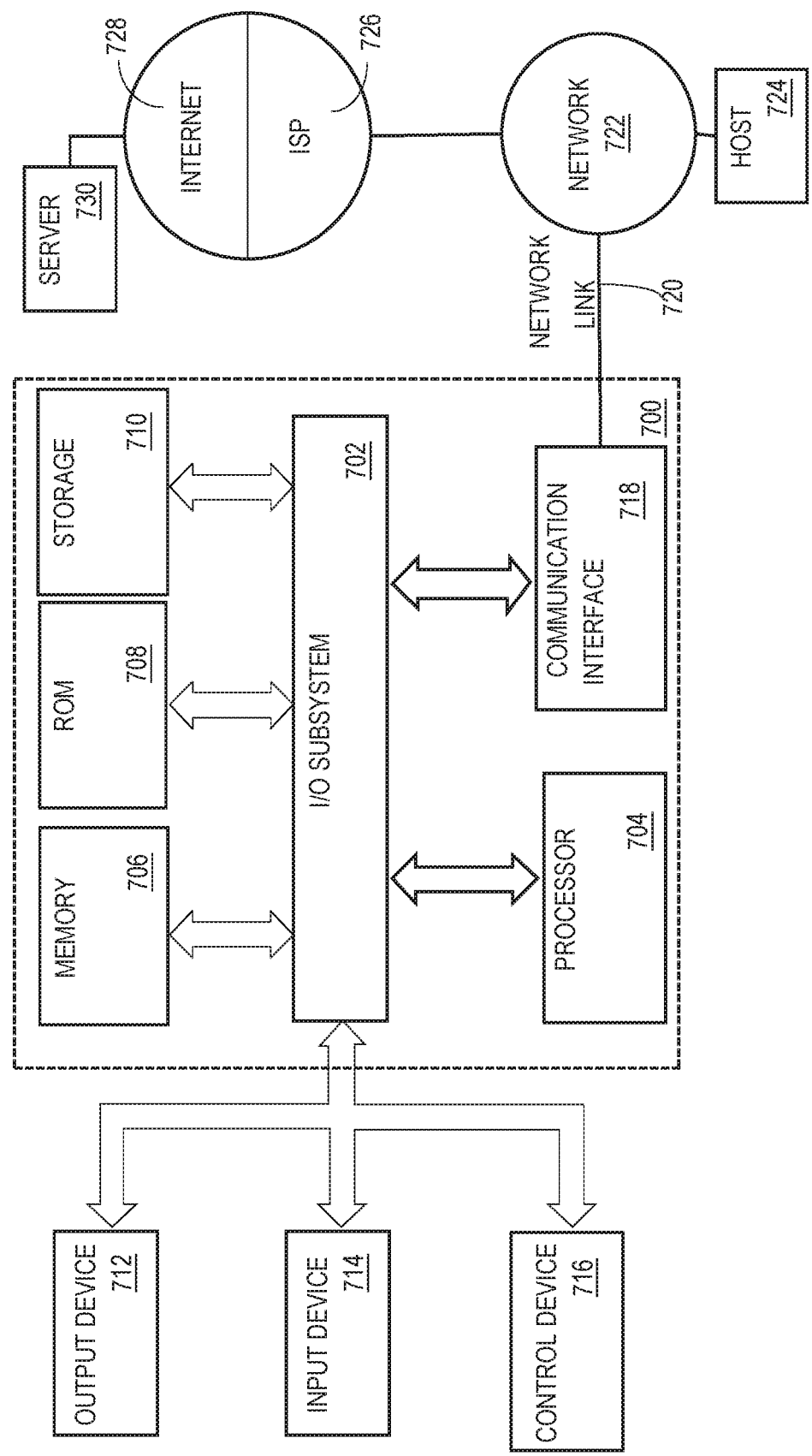
FIG. 7 is a block diagram that illustrates a computer system upon which an embodiment may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

FIG. 8 is a block diagram of a basic software system 800 that may be employed for controlling the operation of computer system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computer system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 700 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
   maintaining, on disk by a database management system, a first table that stores a plurality of columns that comprises one or more geometry-type columns;
   wherein the database management system maintains metadata defining the plurality of columns;
   wherein said metadata includes a definition of one or more virtual columns of said plurality of columns;
   wherein the definition comprises one or more expressions that derive values for the one or more virtual columns from the one or more geometry-type columns;
   creating a set of in-memory columns based on the one or more geometry-type columns at least by materializing results of computing the one or more expressions on the one or more geometry-type columns;
   compiling, by the database management system, a first query that includes a first operator that operates on the one or more geometry-type columns;
   wherein said compiling comprises rewriting the first query to generate a first rewritten query that includes at least one expression of the one or more expressions;
   executing the first rewritten query, wherein said executing the first rewritten query comprises:
   detecting the at least one expression in the first rewritten query, based on said detecting the at least one expression in the first rewritten query, performing one or more tasks, required by the first operator, based on the set of in-memory columns,
   wherein said performing the one or more tasks based on the set of in-memory columns comprises identifying, based on information in the set of in-memory columns, a set of candidate geometry objects stored in the one or more geometry-type columns,
   determining whether one or more geometry objects, of the set of candidate geometry objects, satisfy a requirement of the first rewritten query, and
   in response to determining that the one or more geometry objects satisfy the requirement of the first rewritten query, generating a first result data set based, at least in part, on the one or more geometry objects, and
   returning the first result data set.

2. The computer-executed method of claim 1, further comprising rewriting the first query to generate the first rewritten query that includes the at least one expression of the one or more expressions in response to determining that the first table is represented, in memory, at least in part by the set of in-memory columns.

3. The computer-executed method of claim 1, wherein rewriting the first query to generate the first rewritten query comprises replacing, in the first rewritten query, the first operator with the at least one expression.

4. The computer-executed method of claim 1, wherein creating the set of in-memory columns that materializes results of the one or more expressions comprises computing the one or more expressions for one or more spatial data objects stored in the one or more geometry-type columns.

5. The computer-executed method of claim 1, wherein the one or more virtual columns are not materialized on disk.

6. The computer-executed method of claim 1, wherein the set of in-memory columns are materialized, in memory, in one or more in-memory expression units (IMEUs).

7. The computer-executed method of claim 1, further comprising:
   maintaining, in memory, a copy of data from the one or more geometry-type columns in a mirror format;
   wherein the copy of data from the one or more geometry-type columns is associated with the set of in-memory columns that materializes results of the one or more expressions.

8. The computer-executed method of claim 1, wherein the first operator is of type SDO filter.

9. The computer-executed method of claim 1, wherein the one or more tasks comprise a Single Instruction, Multiple Data (SIMD) scan on at least a portion of the set of in-memory columns.

10. The computer-executed method of claim 1, further comprising:
    compiling, by the database management system, a second query that includes a second operator that operates on the one or more geometry-type columns;
    wherein said compiling comprises rewriting the second query to generate a second rewritten query that includes a particular expression of the one or more expressions;
    executing the second rewritten query, wherein said executing the second rewritten query comprises:
        determining that results of the particular expression in the second rewritten query are not included in memory,
        based on said determining that results of the particular expression in the second rewritten query are not included in memory, performing one or more tasks, required by the second operator, based on the one or more geometry-type columns, and
        returning a second result data set.

11. A computer-executed method comprising:
    maintaining, on disk by a database management system, a first table that stores a plurality of columns that comprises one or more geometry-type columns;
    wherein the one or more geometry-type columns include information defining a particular geometry;
    wherein the database management system maintains metadata defining the plurality of columns;
    wherein said metadata includes a definition of one or more virtual columns of said plurality of columns;
    wherein the definition comprises one or more expressions that derive values for the one or more virtual columns from the one or more geometry-type columns;
    wherein the one or more expressions derive a set of bounding box values from the information defining the particular geometry;
    wherein the set of bounding box values define a bounding box for the particular geometry;
    creating a set of in-memory columns based on the one or more geometry-type columns at least by materializing results of computing the one or more expressions on the one or more geometry-type columns;
    compiling, by the database management system, a query that includes a particular operator that operates on the one or more geometry-type columns;
    wherein said compiling comprises rewriting the query to generate a rewritten query that includes at least one expression of the one or more expressions;
    executing the rewritten query, wherein said executing the rewritten query comprises:
        detecting the at least one expression in the rewritten query, based on said detecting the at least one expression in the rewritten query, performing one or more tasks, required by the particular operator, based on the set of in-memory columns, and
        returning a result data set.

12. The computer-executed method of claim 11, wherein the set of in-memory columns store the set of bounding box values.

13. One or more non-transitory computer-readable media storing one or more sequences of instructions that, when executed by one or more processors, cause:
    maintaining, on disk by a database management system, a first table that stores a plurality of columns that comprises one or more geometry-type columns;
    wherein the database management system maintains metadata defining the plurality of columns;
    wherein said metadata includes a definition of one or more virtual columns of said plurality of columns;
    wherein the definition comprises one or more expressions that derive values for the one or more virtual columns from the one or more geometry-type columns;
    creating a set of in-memory columns based on the one or more geometry-type columns at least by materializing results of computing the one or more expressions on the one or more geometry-type columns;
    compiling, by the database management system, a first query that includes a first operator that operates on the one or more geometry-type columns;
    wherein said compiling comprises rewriting the first query to generate a first rewritten query that includes at least one expression of the one or more expressions;
    executing the first rewritten query, wherein said executing the first rewritten query comprises:
        detecting the at least one expression in the first rewritten query, based on said detecting the at least one expression in the first rewritten query, performing one or more tasks, required by the first operator, based on the set of in-memory columns,
        wherein said performing the one or more tasks based on the set of in-memory columns comprises identifying, based on information in the set of in-memory columns, a set of candidate geometry objects stored in the one or more geometry-type columns,
        determining whether one or more geometry objects, of the set of candidate geometry objects, satisfy a requirement of the first rewritten query, and
        in response to determining that the one or more geometry objects satisfy the requirement of the first rewritten query, generating a first result data set based, at least in part, on the one or more geometry objects, and
        returning the first result data set.

14. The one or more non-transitory computer-readable media of claim 13, wherein the one or more sequences of instructions include a set of instructions that, when executed by the one or more processors, cause rewriting the first query to generate the first rewritten query that includes the at least one expression of the one or more expressions in response to determining that the first table is represented, in memory, at least in part by the set of in-memory columns.

15. The one or more non-transitory computer-readable media of claim 13, wherein rewriting the first query to generate the first rewritten query comprises replacing, in the first rewritten query, the first operator with the at least one expression.

16. The one or more non-transitory computer-readable media of claim 13, wherein creating the set of in-memory columns that materializes results of the one or more expressions comprises computing the one or more expressions for one or more spatial data objects stored in the one or more geometry-type columns.

17. The one or more non-transitory computer-readable media of claim 13, wherein the one or more virtual columns are not materialized on disk.

18. The one or more non-transitory computer-readable media of claim 13, wherein the set of in-memory columns are materialized, in memory, in one or more in-memory expression units (IMEUs).

19. The one or more non-transitory computer-readable media of claim 13, wherein the one or more sequences of instructions further comprise instructions that, when executed by one or more processors, cause:
  maintaining, in memory, a copy of data from the one or more geometry-type columns in a mirror format;
  wherein the copy of data from the one or more geometry-type columns is associated with the set of in-memory columns that materializes the one or more virtual columns.

20. The one or more non-transitory computer-readable media of claim 13, wherein the first operator is of type SDO filter.

21. The one or more non-transitory computer-readable media of claim 13, wherein the one or more tasks comprise a Single Instruction, Multiple Data (SIMD) scan on at least a portion of the set of in-memory columns.

22. The one or more non-transitory computer-readable media of claim 13, wherein the one or more sequences of instructions further comprise instructions that, when executed by one or more processors, cause:
  compiling, by the database management system, a second query that includes a second operator that operates on the one or more geometry-type columns;
  wherein said compiling comprises rewriting the second query to generate a second rewritten query that includes a particular expression of the one or more expressions;
  executing the second rewritten query, wherein said executing the second rewritten query comprises:
    determining that results of the particular expression in the second rewritten query are not included in memory,
    based on said determining that results of the particular expression in the second rewritten query are not included in memory, performing one or more tasks, required by the second operator, based on the one or more geometry-type columns, and
    returning a second result data set.

23. One or more non-transitory computer-readable media storing one or more sequences of instructions that, when executed by one or more processors, cause:
  maintaining, on disk by a database management system, a first table that stores a plurality of columns that comprises one or more geometry-type columns;
  wherein the one or more geometry-type columns include information defining a particular geometry;
  wherein the database management system maintains metadata defining the plurality of columns:
  wherein said metadata includes a definition of one or more virtual columns of said plurality of columns;
  wherein the definition comprises one or more expressions that derive values for the one or more virtual columns from the one or more geometry-type columns;
  wherein the one or more expressions derive a set of bounding box values from the information defining the particular geometry;
  wherein the set of bounding box values define a bounding box for the particular geometry;
  creating a set of in-memory columns based on the one or more geometry-type columns at least by materializing results of computing the one or more expressions on the one or more geometry-type columns;
  compiling, by the database management system, a query that includes a particular operator that operates on the one or more geometry-type columns;
  wherein said compiling comprises rewriting the query to generate a rewritten query that includes at least one expression of the one or more expressions;
  executing the rewritten query, wherein said executing the rewritten query comprises:
  detecting the at least one expression in the rewritten query,
  based on said detecting the at least one expression in the rewritten query, performing one or more tasks, required by the particular operator, based on the set of in-memory columns, and
  returning a result data set.

24. The one or more non-transitory computer-readable media of claim 23, wherein the set of in-memory columns store the set of bounding box values.

* * * * *

UNITED STATES PATENT AND TRADEMARK OFFICE
CERTIFICATE OF CORRECTION

PATENT NO. : 11,507,590 B2
APPLICATION NO. : 16/904392
DATED : November 22, 2022
INVENTOR(S) : Ravada et al.

It is certified that error appears in the above-identified patent and that said Letters Patent is hereby corrected as shown below:

On the Title Page

On page 2, Column 2, under Item (56) Other Publications, Line 14, delete "Sigmond," and insert -- Sigmod, --, therefor.

On page 2, Column 2, under Item (56) Other Publications, Line 20, delete "Buliding DataBlades" and insert -- Building DataBases --, therefor.

On page 2, Column 2, under Item (56) Other Publications, Line 22, delete "Divison," and insert -- Division, --, therefor.

On page 2, Column 2, under Item (56) Other Publications, Line 37, delete "Divison," and insert -- Division, --, therefor.

On page 3, Column 2, under Item (56) Other Publications, Line 1, delete "Chaper" and insert -- Chapter --, therefor.

On page 3, Column 2, under Item (56) Other Publications, Line 3, delete "Buliding DataBlades" and insert -- Building DataBases --, therefor.

On page 3, Column 2, under Item (56) Other Publications, Line 5, delete "Divison," and insert -- Division, --, therefor.

In the Drawings

On sheet 8 of 8, in FIG. 8, under Reference Numeral 830, Line 1, delete "( VMM)" and insert -- (VMM) --, therefor.

Signed and Sealed this
First Day of August, 2023

Katherine Kelly Vidal
*Director of the United States Patent and Trademark Office*

CERTIFICATE OF CORRECTION (continued)
U.S. Pat. No. 11,507,590 B2

In the Specification

In Column 5, Line 42, delete "boundary," and insert -- boundary. --, therefor.

In Column 5, Line 63, delete "Ac)," and insert -- Ae), --, therefor.

In Column 6, Line 24, delete "geometry," and insert -- geometry. --, therefor.

In Column 9, Line 11, delete "(l," and insert -- (1, --, therefor.

In Column 9, Line 17, delete "( )" and insert -- ( ), --, therefor.

In Column 11, Line 9, delete "Objects" and insert -- objects --, therefor.

In Column 14, Line 45, delete "serverinstance" and insert -- server instance --, therefor.

In Column 18, Line 16, delete "SQL/WL" and insert -- SQL/XML --, therefor.

In the Claims

In Column 28, Line 20, in Claim 23, delete "columns:" and insert -- columns; --, therefor.